United States Patent [19]

Skallerup

[11] 4,060,908
[45] Dec. 6, 1977

[54] SIGHTING DEVICE FOR RELOCATION OF SITE

[76] Inventor: Robert M. Skallerup, P.O. Box 160, Cary, Ill. 60013

[21] Appl. No.: 741,035

[22] Filed: Nov. 11, 1976

[51] Int. Cl.$^2$ .................................... G01C 21/00
[52] U.S. Cl. .................... 33/275 R; 33/277; 356/255
[58] Field of Search ............. 356/255, 254, 253, 247, 356/144, 153; 33/280, 276, 277, 278, 280, 282, 272, 254, 255, 275 R

[56] References Cited

U.S. PATENT DOCUMENTS

| 187,432 | 2/1877 | Totten | 356/153 |
|---|---|---|---|
| 1,709,310 | 4/1929 | Dahl | 33/275 R X |
| 2,335,066 | 11/1943 | Lamar | 33/289 X |
| 2,411,306 | 11/1946 | Gaasbeek | 33/275 R |
| 3,031,913 | 5/1962 | Janeska | 356/144 |
| 3,554,630 | 1/1971 | Rogers | 356/255 X |
| 3,876,313 | 4/1975 | Messler et al. | 33/277 X |

*Primary Examiner*—William D. Martin, Jr.
*Attorney, Agent, or Firm*—Dominik, Knechtel, Godula & Demeur

[57] ABSTRACT

A folding sighting device to define and then to relocate the point where the user is placed, said device allowing the user to simultaneously identify linearly opposite reference points to establish a first reference line, and to subsequently fix and record linearly opposite reference points to establish a second reference line which intersects the first reference line. The sighting device or site relocator has an elongated base member with coordinating sighting elements at the opposite ends so that an eye sighting can be made to identify a reference point at a distance from the user. The sighting device or site relocator likewise has a foldable and pivotable sighting member which is likewise elongated and having at least one planar surface towards the user. A mirror with an index line is mounted to the top of the sighting member so when unfolded a reference point is visualized in the mirror simultaneously as with the alignment of the reference point by the coordinated sighting elements on the base member. The two reference points establish the first reference line. The procedure is repeated to establish a second reference line and the intersection establishes the location point to which the user may later return by relocating the visualized reference points. Cooperating latch means are provided to hold the pivotable sighting member in folded, inoperative position against the base member. A grip is provided to hold the base member in sighting position so the reference points are sighted by the user in a common vertical plane, and adjustable stop means are further provided to fix the pivotable sighting member at a desired angle relative to the base member when it is unfolded to operative position.

7 Claims, 5 Drawing Figures

U.S. Patent
Dec. 6, 1977
4,060,908
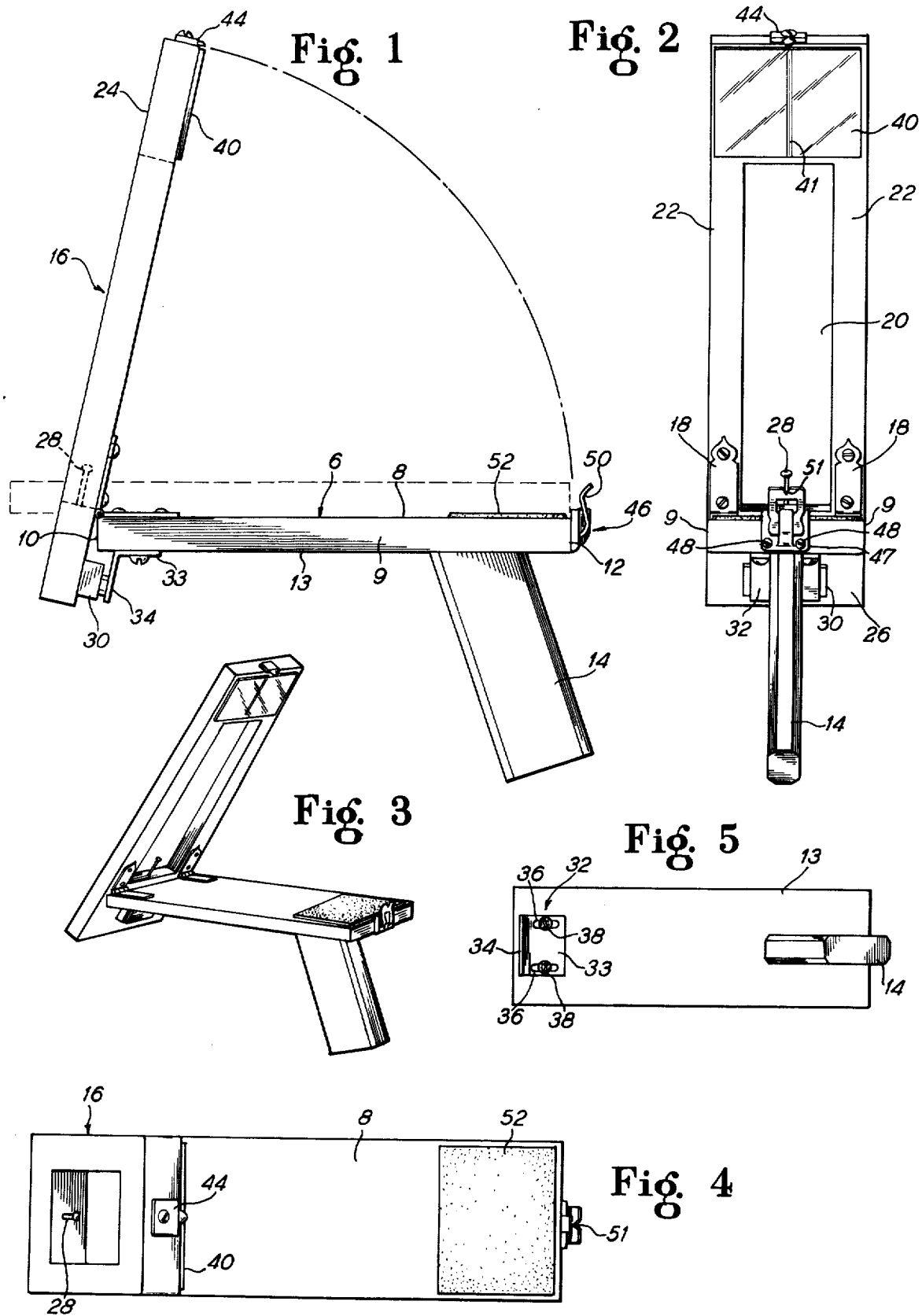

SIGHTING DEVICE FOR RELOCATION OF SITE

FIELD OF THE INVENTION

This invention relates to a sighting device, and more particularly a site relocator, to enable a user to identify a site which the user occupies and desires to relocate at a later time. The device allows the user to simultaneously identify two reference points, the user being between the reference points. These points establish a first reference line, and thereafter to identify two other reference points simultaneously to establish a second reference line which intersects the first at the user's location. The intersection is the site which the user occupies and which can be relocated at a later date.

RELEVANT BACKGROUND AND PRIOR ART UNCOVERED BY APPLICANT

The device of this invention has not been found by applicant in the prior art, and representative art which is viewed as relevant is as follows. U.S. Pat. No. 889,551 shows a forward mirror and a rear sighting device on a rifle, the sighting device not being visualized in the mirror when the rifle is incorrectly aimed. There is no provision of simultaneously finding linearly opposite reference points with this teaching. A more sophisticated device for aligning two points may be found in patents such as U.S. Pat. No. 2,307,759 and U.S. Pat. No. 2,821,104, but the structure and function is far removed from the teaching of the present invention. An illustration of representative art is U.S. Pat. No. 3,554,630 which utilizes an assembly of lenses and a mirror for establishing a reference line at right angles to the original reference line and the process known as "autocollimation". Such teaching is likewise far removed from the present invention.

OBJECTS AND ADVANTAGES OF THE INVENTION

An object of the present invention is to provide an improved and simple site relocator to identify a location site to which a user can return, particularly useful for fishermen who wish to "sight" a favorite spot on a lake for subsequent return and use. It is desirable to have a device which is inexpensive but reliable and accurate to enable the fisherman, with confidence, to return to such a location.

Another object of the invention is to use the improved site relocator, of the type described, for allowing users to record an occupied location site in a wide variety of uses which require the user to relocate or return to such occupied location sites at a later time. Representative examples of such use is the relocation of underground equipment, such as tanks, valves, cables and junctions. Other uses could be enjoyed by users such as farmers, excavators and road builders wherein a good line can be established between reference points without requiring a helper, or so a line can be extended or run out. Still other representative users could be surveyors who would establish a rough or preliminary layout with great time savings.

Another object is a sighting device or point relocator, of the type described, which can be folded for portable transport, but which can be readily unfolded to operative position at a preset and determined angle of one of the sighting members, thus allowing the user to fix a reference line by simultaneously sighting and recording linearly opposite reference points. It is an important feature and advantage of this object that the user can at a later time quickly, reliably and conveniently place himself on the respective reference lines which have been previously identified without requiring the use of a helper, a string or the like.

DESCRIPTION OF THE VIEWS OF THE DRAWINGS

The above objects and advantages are realized, together with still other objects and advantages which will occur to practitioners, by the invention which is now disclosed in detail in the following disclosure, including drawings wherein:

FIG. 1 is a side elevational view of the sighting device shown in operative position.

FIG. 2 is an end elevational view of the sighting device shown in the view of FIG. 1, said end view taken from a near eye position of the observer.

FIG. 3 is a perspective view of the device shown in FIGS. 1 and 2, but on a somewhat reduced scale.

FIG. 4 is a top plan view of the sighting device shown in foregoing FIGS. 1 and 2.

FIG. 5 is a bottom plane view of the base member of the sighting device, on a somewhat reduced scale, to illustrate the adjustable intercept means to hold the pivotable sighting member in a predetermined adjustable angular position relative to the base member.

SUMMARY OF THE INVENTION

There is now provided a simply and economically constructed sighting device or site relocator which allows the user to simultaneously visualize and record linearly opposite locator points, one in front and the other in back of the user. The device includes an elongated base member having a grip mounted thereto so that the base member may be desirably positioned in a sighted or established vertical plane. The elongated base member has coordinated sighting element at the opposite ends, one end being a remote eye end and the other end being the near eye end of the base member. Preferably, the remote eye end is a fixed sighting line and the near eye has a coordinated sighting means to capture the fixed sighting line, such coordinated sighting means at the near eye end being a notch, a circle, or the like.

The sighting device also includes a pivotable sighting member mounted to the remote eye end of the base member. The pivotable means, such as hinges, hold the elongated sighting member, and said sighting member has a window or opening to allow the viewer clear visualization of the coordinating sighting elements. The top of the pivotable sighting member has a mounted mirror, preferably with a reference line, and said pivotable sighting member is unfolded from inoperative position against the top side of the base member to a preset angle relative to the base member in operative position. Such preset angle is obtained by providing an adjustable stop means on the bottom of the base member to intercept the bottom of the pivotable member which extends below the bottom side of the base member. One such adjustable and intercepting means may be a magnetic element and a repositionable metallic plate. The repositionable metallic plate, for example, may be mounted to the bottom of the base member at the remote eye end and the magnetic element may be mounted on the pivotable sighting member at the bottom below the base member. Presetting the adjustable metallic plate will allow the magnetic element to intercept the plate when the sighting member is unfolded to operative position. The user, at the desired site location, which is desired to be recorded, will identify a reference point with the coordinated sighting elements which reference is at a distance from the site of the user. Simultaneously, the user will note a linearly opposite reference point in the mirror of the unfolded pivotable sighting member. The user will record these two reference points to identify a first reference line, then repeat the procedure to establish a second reference line which intersects the first. The point of intersection will coincide with the site occupied by the user. At a later time, the user will relocate this point by reestablishing the two reference lines relevant to the reference points.

DETAILED DESCRIPTION OF THE INVENTION

Looking first at FIGS. 1-3, there is seen a rectangular base member 6 having a top side 8, opposite sides 9, a forward end 10, a rear end 12, and a bottom side 13. It is seen that the top sides and bottom sides are planar, but it could be otherwise. Hand grip 14 is shown angularly mounted to the bottom side of the base member towards the rear end 12. The rear end 12 is also considered as a near eye end of the base member, that is, nearest to where the user positions the eye for making the sightings.

The sighting device is then seen to include an elongated pivotable sighting member, shown generally as 16. Such sighting member is held by pivotal means or hinged members 18 to the top of the side of the base member, a pair of hinges being shown. The elongated pivotable sighting member has an elongated opening or window 20 to allow the user to have a clear view when making a sighting.

The pivotable sighting member is further shown as having side frames 22 spacing the opening or window, a top body portion 24 further defining the opening, and a bottom body portion 26 still further defining the opening or window. The bottom of the opening in the pivotable sighting member 16 has a front or fixed sighting line 28 which is shown as being mounted in the bottom body portion 26 of the pivotable sighting member. A pin, wire or the like may serve as the sighting line. It is further seen that the bottom portion extends below the bottom side of the base member, and a magnetic element 30 is shown mounted to said pivotable sighting member.

Adjacent the magnetic element 30 is shown adjustable intercept means, particularly in the form of an adjustable metallic angle 32. Such angle has a mounting plate 33 attached to the bottom side of the base member and a depending contact plate 34 which is positioned to intercept the magnetic element. The adjustable means may be positioned relative to the remote forward end 10 or the remote eye end of the base member.

The means for adjusting such means may best be seen by the view of FIG. 5. The contact plate is shown with a pair of elongated slots 36 which are spaced from each other and which are parallel to the long axis of the base member. Releasable fasteners or screws 38 fix the plate in a preselected or predetermined position relative to the forward end 10 or remote eye end of the base member.

The top body portion of the pivotable sighting end is shown as having a mirror 40 which is bisected by an index line 41. The index line aids the user in simultaneously identifying a reference point on a reference line which is linearly opposite the reference point sighted at the remote eye end of the base member. The user is, of course, between these reference points. As stated, a common vertical plane is for the reference points, and this may not always be the same as a true horizontal placement. A user will quickly acquire skill in sighting a practical and useful vertical plane for the reference points. Means may be provided on the site relocator to establish a vertical plane, such as a leveller assembly with bubble, shown generally at 42, see FIG. 2.

The end of the pivotable sighting member 16 as shown with a fixed finger latch 44 which cooperates with a biased latch and sighting assembly 46 at the near eye end of the base member. The bias latch and sighting assembly includes a mounting plate 47 fixed to the near eye of the base member by fasteners such as screws. Such assembly also has a biased "S" latch 50 which is displaced by the fixed finger latch 44 when the pivotable member is rotated to folded inoperative position.

The biased latch and sighting assembly 46 is also provided with a sighting means shown as sighting notch 51 that is coordinated with the fixed sighting line 28. The sighting line is fixed in the notch so that the user can align a first reference point at a distance beyond the remote eye end of the base member. At the same time, the user will note a reference point in the mirror 40, defined by the index line 41, which is linearly opposite to the reference point established by the aligned coordinated sighting elements of the base member.

The top side of the base member is shown as having a cushioning pad 52 at the near eye end of the base member. This pad is positioned to cushion a planar mirror when the pivotable sighting member is folded to inoperative position. The cooperating latch means lock said pivotable sighting member in such inoperative position.

The claims of the invention are now presented, and the terms of such claims may be further understood by the language of the preceeding specification and the views of the drawings.

What is claimed is:

1. A folding site relocator to visualize reference points identifying intersecting lines, said recorded reference points being relocated through visualization to subsequently re-establish intersecting lines and relocate the site, including an elongated base member having a near eye sighting end, a remote eye sighting end and a fixed sighting element mounted at the near eye sighting end thereof; an elongated sighting member pivotally affixed at one end thereof to said remote eye sighting end of said base member, said sighting member having an opening therein adjacent a top side of said base member, a fixed sighting line in said opening and a sighting mirror having thereon a vertical index line mounted on said sighting member above said fixed sighting line, said fixed sighting element on said base member, said opening with said fixed sighting line therein and said sighting mirror with said vertical index line thereon all being aligned in the same vertical plane to permit a reference point and a linearly opposite reference point to be simultaneously identified to establish a reference line, whereby a reference point can be located by establishing a first and a second reference line which intersect one another.

2. A folding site relocator, as claimed in claim 1, further comprising gripping means for supporting said site relocator during use thereof.

3. A folding site relocator, as claimed in claim 1, further comprising leveler means mounted on at least one of said base member and said sighting member to aid a user in establishing a substantially vertical plane for the reference points.

4. A folding site relocator, as claimed in claim 1, further comprising means for adjusting the angle of the sighting member relative to the long axis of the base member, said adjustment beans being mounted on the bottom side of the base member and being repositionable to intercept a bottom portion of said pivotable sighting member extending below the bottom side of said base member.

5. A folding site relocator, as claimed in claim 4, wherein said adjustable means on the bottom side of said base member is a metal angle having a depending plate which can be repositioned relative to the remote eye end of said base member, and the bottom portion of said pivotable sighting member extending below the bottom side of said base member has a magnet element to intercept said depending plate.

6. A folding site relocator, as claimed in claim 1, comprising latch means forming a releasable interlock for releasably securing said site relocator in a folded condition for storage when folded to an inoperative folded position.

7. A folding site relocator, as claimed in claim 1, further comprising a cushion pad mounted on said base member for cushioning said mirror against breakage when said site relocator is folded to inoperative folded position.

* * * * *